(12) United States Patent
Ito et al.

(10) Patent No.: US 10,944,122 B2
(45) Date of Patent: Mar. 9, 2021

(54) ELECTROCHEMICAL DEVICE

(71) Applicant: NGK INSULATORS, LTD., Nagoya (JP)

(72) Inventors: Risako Ito, Nagoya (JP); Makoto Ohmori, Nagoya (JP)

(73) Assignee: NGK INSULATORS, LTD.

(*) Notice: Subject to any disclaimer, the term of this patent is extended or adjusted under 35 U.S.C. 154(b) by 76 days.

(21) Appl. No.: 16/299,856

(22) Filed: Mar. 12, 2019

(65) Prior Publication Data

US 2019/0204264 A1 Jul. 4, 2019

Related U.S. Application Data

(63) Continuation of application No. PCT/JP2018/047851, filed on Dec. 26, 2018.

(30) Foreign Application Priority Data

Dec. 26, 2017 (JP) ................................. 2017-249522
Oct. 18, 2018 (JP) ................................. 2018-196731

(51) Int. Cl.
*H01M 8/1231* (2016.01)
*H01M 8/10* (2016.01)
(Continued)

(52) U.S. Cl.
CPC ........... *H01M 8/1231* (2016.02); *H01M 8/02* (2013.01); *H01M 8/04089* (2013.01);
(Continued)

(58) Field of Classification Search
CPC .. H01M 8/02; H01M 8/04089; H01M 8/0662; H01M 8/10; H01M 8/1231;
(Continued)

(56) References Cited

U.S. PATENT DOCUMENTS

2005/0031931 A1* 2/2005 Kabumoto ............. B01D 53/02
429/410
2016/0248111 A1* 8/2016 Gasda ................. H01M 8/0668

FOREIGN PATENT DOCUMENTS

| JP | 2001-155742 A | 6/2001 |
| JP | 2013-054970 A | 3/2013 |
| JP | 2015-090788 A | 5/2015 |

OTHER PUBLICATIONS

English translation of International Preliminary Report on Patentability and Written Opinion of the International Searching Authority, issued in corresponding International Application No. PCT/JP2018/047851, dated Jul. 9, 2020 (9 pages).
(Continued)

*Primary Examiner* — Gregg Cantelmo
(74) *Attorney, Agent, or Firm* — Flynn Thiel, P.C.

(57) ABSTRACT

An electrochemical device includes an electrochemical cell, an oxidizer gas supply portion, and a first contaminant trap portion. The electrochemical cell includes an anode, a cathode, and a solid electrolyte layer provided between the fuel cell and the cathode. The oxidizer gas supply portion includes an oxidizer gas supply port for supplying oxidizer gas to the cathode. The first contaminant trap portion is provided between the cathode and the oxidizer gas supply port and configured to adsorb contaminants contained in the oxidizer gas. At least part of the first contaminant trap portion is disposed 20 mm or less from the oxidizer gas supply port in a gas supply direction in which the oxidizer gas is supplied from the oxidizer gas supply port.

11 Claims, 5 Drawing Sheets

(51) Int. Cl.
  *H01M 8/241*    (2016.01)
  *H01M 8/02*     (2016.01)
  *H01M 8/04089*  (2016.01)
  *H01M 8/0662*   (2016.01)
  *H01M 8/124*    (2016.01)

(52) U.S. Cl.
  CPC ........... *H01M 8/0662* (2013.01); *H01M 8/10* (2013.01); *H01M 8/241* (2013.01); *H01M 2008/1293* (2013.01); *H01M 2300/0071* (2013.01); *H01M 2300/0074* (2013.01)

(58) Field of Classification Search
  CPC ......... H01M 8/241; H01M 2300/0071; H01M 2300/0074; H01M 2008/1293
  See application file for complete search history.

(56) References Cited

OTHER PUBLICATIONS

Co-pending U.S. Appl. No. 16/246,828, filed Jan. 14, 2019.
Co-pending U.S. Appl. No. 16/246,831, filed Jan. 14, 2019.
Japanese Language International Search Report and Written Opinion for corresponding PCT/JP2018/047851, dated Feb. 12, 2019 (9 pgs).
English translation of International Search Report issued in International Application No. PCT/JP2018/047851, dated Feb. 12, 2019 (1 page).

* cited by examiner

ELECTROCHEMICAL DEVICE

CROSS-REFERENCE TO RELATED APPLICATIONS

This is a continuation of PCT/JP2018/047851, filed Dec. 26, 2018, which claims priority to Japanese Application Nos. 2017-249522, filed Dec. 26, 2017, and 2018-196731, filed Oct. 18, 2018 the entire contents of which are hereby incorporated by reference.

TECHNICAL FIELD

The present invention relates to an electrochemical device.

BACKGROUND ART

In a conventional solid oxide fuel cell, a solid electrolyte layer is provided between the anode and the cathode of the fuel cell.

When the solid oxide fuel cell operates, a fuel gas (for example, hydrogen gas) is supplied to the anode and an oxidizer gas (for example, air) is supplied to the cathode.

In Japanese Patent Unexamined Publication 2015-090788, there is proposed a method of disposing a contaminant trap portion between an oxidizer gas supply port and the cathode in order to minimize a reduction in the catalytic activity of the cathode caused by contaminants in the oxidizer gas.

SUMMARY

The inventors of the present invention performed tests using the method disclosed in Japanese Patent Unexamined Publication 2015-090788 and found that the contaminant trap portion can effectively trap contaminants because the molecular motion in the contaminant trap portion becomes slower as the temperature of the oxidizer gas that passes through the contaminant trap portion decreases.

The present invention has been made in light of the aforementioned circumstances, and it is an object of the present invention to provide an electrochemical device that can effectively trap contaminants in an oxidizer gas.

An electrochemical device includes an electrochemical cell, an oxidizer gas supply portion, and a first contaminant trap portion. The electrochemical cell includes an anode, a cathode, and a solid electrolyte layer provided between the fuel cell and the cathode. The oxidizer gas supply portion includes an oxidizer gas supply port for supplying the oxidizer gas to the cathode. The first contaminant trap portion is provided between the cathode and the oxidizer gas supply port and configured to adsorb the contaminants contained in the oxidizer gas. At least part of the first contaminant trap portion is disposed 20 mm or less from the oxidizer gas supply port in a gas supply direction in which the oxidizer gas is supplied from the oxidizer gas supply port.

According to the present invention, there can be provided an electrochemical device that can effectively trap the contaminants in an oxidizer gas.

DESCRIPTION OF EMBODIMENTS

1. First Embodiment (Configuration of Fuel Cell Device 1)

Figure 1:
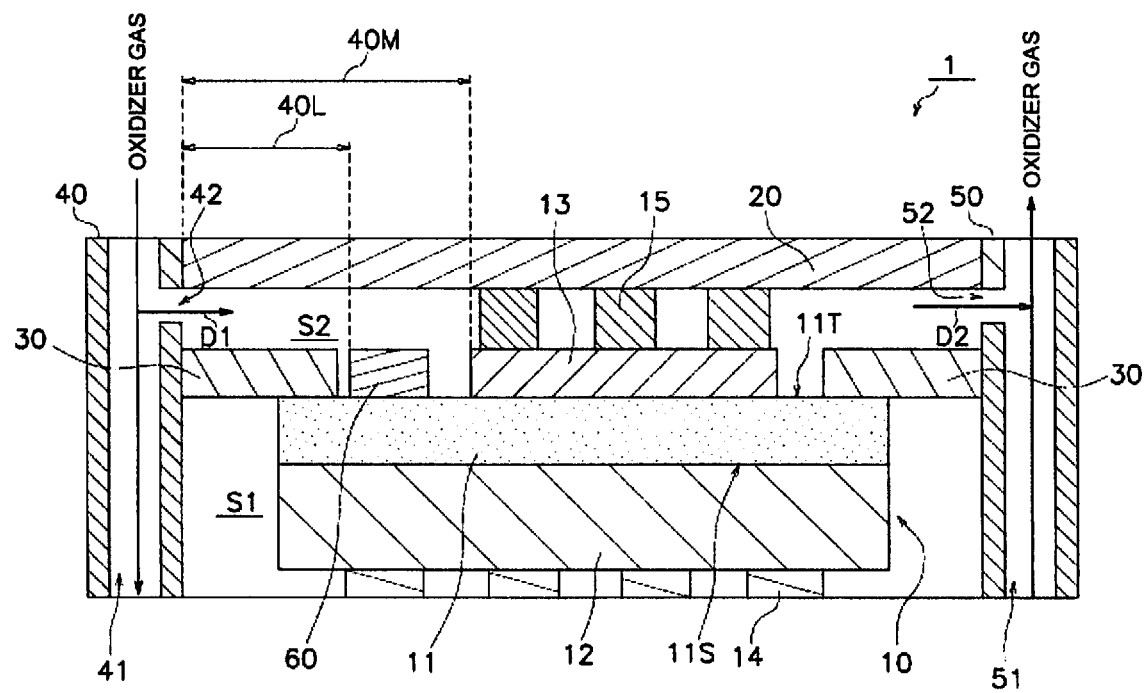
FIG. 1 is a cross-sectional view illustrating the configuration of a fuel cell device according to a first embodiment.

The configuration of a fuel cell device 1 according to a first embodiment is described with reference to the figures. FIG. 1 is a cross-sectional view illustrating the configuration of the fuel cell device 1.

The fuel cell device 1 includes a fuel cell 10, an interconnector 20, separators 30, an oxidizer gas supply portion 40, an oxidizer gas discharge portion 50 and a contaminant trap portion 60. A plurality of the fuel cell devices 1 are stacked to form a fuel cell stack.

(Fuel Cell 10)

The fuel cell 10 includes a solid electrolyte layer 11, an anode 12, a cathode 13, an anode-side current collector 14 and a cathode-side current collector 15.

The fuel cell 10 according to this embodiment is an anode-supporting cell in which the anode 12 is much thicker than the cathode 13 and the solid electrolyte layer 11. However, the fuel cell 10 is not limited thereto. The fuel cell 10 may be a cathode-supporting cell in which the cathode 13 is much thicker than the solid electrolyte layer 11 and the anode 12, or may be an electrolyte-supporting cell in which the solid electrolyte layer 11 is much thicker than the anode 12 and the cathode 13.

The solid electrolyte layer 11 is formed into a thin plate shape. The thickness of the solid electrolyte layer 11 may be between 3 μm and 20 μm. The solid electrolyte layer 11 is formed of an oxygen ion-conductive electrolyte material that causes the oxygen ions generated at the cathode 13 to travel to the anode 12. Examples of such an electrolyte material include one type or a combination of two or more types of yttria-stabilized zirconia (YSZ), scandia-stabilized zirconia (ScSZ), samarium doped ceria ($CeSmO_2$), gadolinium doped ceria ($CeGdO_2$), and calcia-stabilized zirconia (CaSZ).

The solid electrolyte layer 11 is dense and prevents the oxidizer gas from passing through the side of the anode 12 and the fuel gas from passing through the side of the cathode 13. The relative density of the solid electrolyte layer 11 when measured using the Archimedes' method is preferably 95% or higher.

The anode 12 is disposed on a first primary surface 11S of the solid electrolyte layer 11. The anode 12 functions as the anode of the fuel cell 10. The anode 12 is porous.

The anode 12 is disposed inside a fuel gas chamber S1. Fuel gas is supplied to the fuel gas chamber S1 from a fuel gas supply unit (not shown). Examples of the fuel gas include hydrogen, a hydrocarbon, and a mixed gas containing hydrogen and a hydrocarbon. Examples of the hydrocarbon include natural gas, naphtha and gas produced by coal gasification. However, the hydrocarbon is not limited thereto. The fuel gas may be one type of hydrocarbon or a mixture of two or more types of hydrocarbons. The fuel gas may contain an inert gas such as nitrogen or argon.

The anode 12 is made from a widely known anode material. The anode 12 may consist of, for example, a mixture of a metal such as Ni and/or Fe and the above-described electrolyte material.

The cathode 13 is disposed on a second primary surface 11T of the solid electrolyte layer 11. The cathode 13 functions as the cathode of the fuel cell 10. The cathode 13 is porous. The porosity of the cathode 13 is not particularly limited and may be 10% or higher. The thickness of the cathode 13 is not particularly limited and may be, for example, between 30 μm and 200 μm.

The cathode 13 is disposed inside an oxidizer gas chamber S2. Oxidizer gas is supplied to the oxidizer gas chamber S2 from the oxidizer gas supply portion 40. After passing through the cathode 13, the oxidizer gas is discharged from the oxidizer gas chamber S2 by the oxidizer gas discharge portion 50. The oxidizer gas chamber S2 includes an upstream space that extends from an oxidizer gas supply port 42 (described later) to the cathode 13, the air holes in the cathode 13, and a downstream space that extends from the cathode 13 to an oxidizer gas discharge port 52 (described later). A mixed gas containing oxygen and another gas, for example, can be used as the oxidizer gas. Air is preferably used as the oxidizer gas because air is safe and cheap. The oxidizer gas may contain an inert gas such as nitrogen or argon.

The cathode 13 may be made of a material that can conduct oxygen ions in electrodes. This material is preferably a complex oxide that contains at least one type of element among La, Sr, Co and Fe. Examples of the complex oxide include a $La_{1-x}Sr_xCoO_3$-type complex oxide, a $La_{1-x}Sr_xFeO_3$-type complex oxide, a $La_{1-x}Sr_xCo_{1-y}Fe_yO_3$-type complex oxide, $La_{1-x}Sr_xMnO_3$-type complex oxide, a $Pr_{1-x}Ba_xCoO_3$-type complex oxide, and a $Sm_{1-x}Sr_xCoO_3$-type complex oxide.

The anode-side current collector 14 is electrically and mechanically bonded to the anode 12. An example of the material used to make the anode-side current collector 14 is breathable nickel felt. The anode-side current collector 14 is sandwiched between the anode 12 and the interconnector 20 when the fuel cell devices 1 are stacked. The anode-side current collector 14 may be formed integrally with the interconnector 20.

The cathode-side current collector 15 is electrically and mechanically connected to the cathode 13. An example of the material used to make the cathode-side current collector 15 is a metal material such as a silver-palladium alloy. The cathode-side current collector 15 is sandwiched between the cathode 13 and the interconnector 20. The cathode-side current collector 15 may be formed integrally with the interconnector 20.

(Interconnector 20)

The interconnector 20 is electrically connected to the cathode 13. In this embodiment, the interconnector 20 is electrically connected to the cathode 13 through the cathode-side current collector 15. The interconnector 20 is electrically and mechanically connected to the cathode-side current collector 15. The interconnector 20 is sandwiched between adjacent fuel cells 10 when the fuel cell devices 1 are stacked. In this case, the interconnector 20 is electrically and mechanically connected to both the anode-side current collector 14 and the cathode-side current collector 15.

The interconnector 20 may be made from a metal and is preferably made from stainless steel.

(Separator 30)

The separators 30 are disposed so as to surround the periphery of the fuel cell 10. The separators 30 according to this embodiment are bonded to the second primary surface 11T of the solid electrolyte layer 11 and are arranged so as to surround the cathode 13.

The separators 30 separate the fuel gas chamber S1 and the oxidizer gas chamber S2 from each other. In other words, similar to the solid electrolyte layer 11, the separators 30 prevent the oxidizer gas from passing through the anode 12 side and the fuel gas from passing through the cathode 13 side.

The separators 30 may be made from a metal and are preferably made from stainless steel.

(Oxidizer Gas Supply Portion 40)

The oxidizer gas supply portion 40 is disposed to the side of the fuel cell 10. The oxidizer gas supply portion 40 has an oxidizer gas supply path 41 and an oxidizer gas supply port 42.

The oxidizer gas supply path 41 extends along a stacking direction in which the fuel cells 10 are stacked. When a plurality of the fuel cell devices 1 are stacked, the oxidizer gas supply paths 41 become continuous to form one oxidizer gas supply path.

The oxidizer gas supply port 42 is continuous with the oxidizer gas supply path 41. The oxidizer gas supply port 42 is open toward the oxidizer gas chamber S2. The oxidizer gas supply port 42 is open toward the fuel cell 10.

Oxidizer gas is supplied to the oxidizer gas chamber S2 after passing through the oxidizer gas supply path 41 and the oxidizer gas supply port 42 in that order. As illustrated in FIG. 1, the oxidizer gas supplied to the oxidizer gas chamber S2 from the oxidizer gas supply portion 40 flows in from the oxidizer gas supply port 42 along a gas supply direction D1. In other words, the oxidizer gas flows in the gas supply direction D1 when entering the oxidizer gas chamber S2. As illustrated in FIG. 1, the gas supply direction D1 may be a direction that directly faces the cathode 13 or may be a direction that does not directly face the cathode 13.

(Oxidizer Gas Discharge Portion 50)

The oxidizer gas discharge portion 50 is disposed to the side of the fuel cell 10. The oxidizer gas discharge portion 50 has an oxidizer gas discharge path 51 and an oxidizer gas discharge port 52.

The oxidizer gas discharge path 51 extends along the stacking direction in which the fuel cells 10 are stacked. When a plurality of the fuel cell devices 1 are stacked, the oxidizer gas discharge paths 51 become continuous to form one oxidizer gas discharge path.

The oxidizer gas discharge port 52 is continuous with the oxidizer gas discharge path 51. The oxidizer gas discharge port 52 is open toward the oxidizer gas chamber S2. The oxidizer gas discharge port 52 is open toward the fuel cell 10.

Oxidizer gas is discharged from the oxidizer gas chamber S2 after passing through the oxidizer gas discharge port 52 and the oxidizer gas discharge path 51 in that order. As illustrated in FIG. 1, the oxidizer gas discharged from the oxidizer gas chamber S2 by the oxidizer gas discharge portion 50 is discharged from the oxidizer gas discharge port 52 along a gas discharge direction D2. In other words, the oxidizer gas flows in the gas discharge direction D2 when being discharged from the oxidizer gas chamber S2. As illustrated in FIG. 1, the gas discharge direction D2 may be a direction parallel with the gas supply direction D1 during the gas supply or a direction that is not parallel with the gas supply direction D1.

(Contaminant Trap Portion 60)

The contaminant trap portion 60 is an example of a "first contaminant trap portion" according to the present invention. In this embodiment, the contaminant trap portion 60 is disposed on the second primary surface 11T of the solid electrolyte layer 11. The contaminant trap portion 60 is made from a substance that adsorbs the contaminants contained in the oxidizer gas when the oxidizer gas passes over the surface of the contaminant trap portion 60 or through the contaminant trap portion 60.

Here, a "contaminant" is defined as a substance in the oxidizer gas that can be adsorbed by the cathode 13 to decrease the catalytic activity. For example, when a contaminant reacts with the compound oxide in the cathode 13 and generates a reaction product, this reaction products blocks the holes in the cathode 13 and the cathode 13 is no longer supplied with a sufficient amount of the oxidizer gas. As a result, there is insufficient catalytic activity of the cathode 13. There is also the possibility that the contaminant will react with the compound oxide of the cathode 13 and be transformed into another substance that has no catalytic activity. When catalytic activity of the cathode 13 decreases, the fuel cell 10 loses its power generation performance.

Examples of the contaminant include a substance (for example, SOx) containing at least one type of element among S, Cr, Si, B and Cl. The contaminant may contain $H_2O$.

The contaminant trap portion 60 is made from a material that can trap the contaminant. Examples of this material include MgO, SrO, and glass, but the material is not limited thereto.

The contaminant trap portion 60 preferably contains a metal oxide. The metal oxide is preferably an oxide containing at least one type of element selected from the group consisting of La, Sr, Sm, Gd, Pr, Nd, Co and Fe. The metal oxide is preferably a complex oxide and even more preferably the material used to form the cathode 13 (for example, a $La_{1-x}Sr_xCo_{1-y}Fe_yO_3$-type complex oxide).

The contaminant trap portion 60 preferably further contains the above-described contaminant. With this configuration, reaction activity in the contaminant trap portion 60 increases and contaminants can be effectively trapped. In order to impregnate the contaminant trap portion 60 with a contaminant, the contaminant can be doped on the metal oxide and then heat-treated (at 600° C. to 1,200° C. and from one hour to 20 hours).

Oxidizer gas can permeate the contaminant trap portion 60. The open porosity of the contaminant trap portion 60 when measured using the Archimedes' method is not particularly limited and may be between 10% and 50%. The shape of the contaminant trap portion 60 is not particularly limited. The contaminant trap portion 60 may be formed into the shape of a film, a layer, a plate, a cuboid or a sphere. Alternatively, the contaminant trap portion 60 may be divided into a plurality of components that are disposed separately.

The contaminant trap portion 60 is disposed on the side of the oxidizer gas supply port 42 of the cathode 13 in the oxidizer gas chamber S2. In other words, the contaminant trap portion 60 is disposed in the upstream space that extends from the oxidizer gas supply port 42 to the cathode 13 in the oxidizer gas chamber S2. The contaminant trap portion 60 is located upstream of the cathode 13 in the gas supply direction D1.

Because of this, the oxidizer gas supplied toward the cathode 13 from the oxidizer gas supply port 42 flows to the cathode 13 after passing through the contaminant trap portion 60. Therefore, any contaminants that may decrease the catalytic activity of the cathode 13 can be trapped (adsorbed, removed) from the oxidizer gas.

In this embodiment, at least part of the contaminant trap portion 60 is disposed 20 mm or less from the oxidizer gas supply port 42 in the gas supply direction D1 in which the oxidizer gas is supplied from the oxidizer gas supply port 42. In other words, a minimum distance 40L between the contaminant trap portion 60 and the oxidizer gas supply port 42 in the gas supply direction D1 is 20 mm or less. Therefore, the oxidizer gas can be supplied to the contaminant trap portion 60 before the oxidizer gas increases in temperature due to the atmospheric temperature in the oxidizer gas chamber S2. Therefore, because the contaminant trap portion 60 can be supplied with the oxidizer gas at a relatively low temperature, the molecular motion in the contaminant trap portion 60 becomes slower and contaminants can be effectively trapped by the contaminant trap portion 60.

The minimum distance 40L between the contaminant trap portion 60 and the oxidizer gas supply port 42 in the gas supply direction D1 is preferably two thirds or less a minimum distance 40M between the cathode 13 and the oxidizer gas supply port 42 in the gas supply direction D1, and more preferably half or less the minimum distance 40M. With this configuration, the contaminants can be effectively trapped and the fuel cell 10 can be downsized.

In this embodiment, the contaminant trap portion 60 is separated from the cathode 13. Therefore, the contaminants that have been adsorbed by the contaminant trap portion 60 can be prevented from dispersing to the cathode 13. The contaminant trap portion 60 is also preferably separated from the cathode-side current collector 15 and the interconnector 20 in addition to the cathode 13.

In this embodiment, the contaminant trap portion 60 does not contribute to the power generation. In other words, the contaminant trap portion 60 does not function as a current path associated with a chemical reaction in the fuel cell 10. Because the contaminant trap portion 60 does not contribute to the power generation, the power generation performance is less likely to suffer, even if the contaminant trap portion 60 has trapped contaminants.

(Manufacturing Method for Fuel Cell Device 1)

An example of a manufacturing method for the fuel cell device 1 is now described.

First, a slurry for the cathode 13 and a slurry for the contaminant trap portion 60 are separately applied to and dried on the second primary surface 11T of a green sheet for the solid electrolyte layer 11 that has been placed on a green sheet for the anode 12. Then, the slurries are calcined to form the fuel cell 10 that includes the solid electrolyte layer 11, the anode 12 and the cathode 13.

Next, the separators 30 are welded to the second primary surface 11T of the solid electrolyte layer 11.

Then, the anode-side current collector 14 is connected to the anode 12, and the cathode-side current collector 15 and the interconnector 20 are sequentially connected to the cathode 13. When stacking a plurality of the fuel cell devices 1, a plurality of the fuel cells 10 in which the interconnector 20 and the separators 30 have been connected to each other can be stacked.

Then, the oxidizer gas supply portion 40 and the oxidizer gas discharge portion 50 are disposed to the sides of the fuel cell 10 in which the interconnector 20 and the separators 30 have been connected to each other.

2. Second Embodiment

Figure 2:
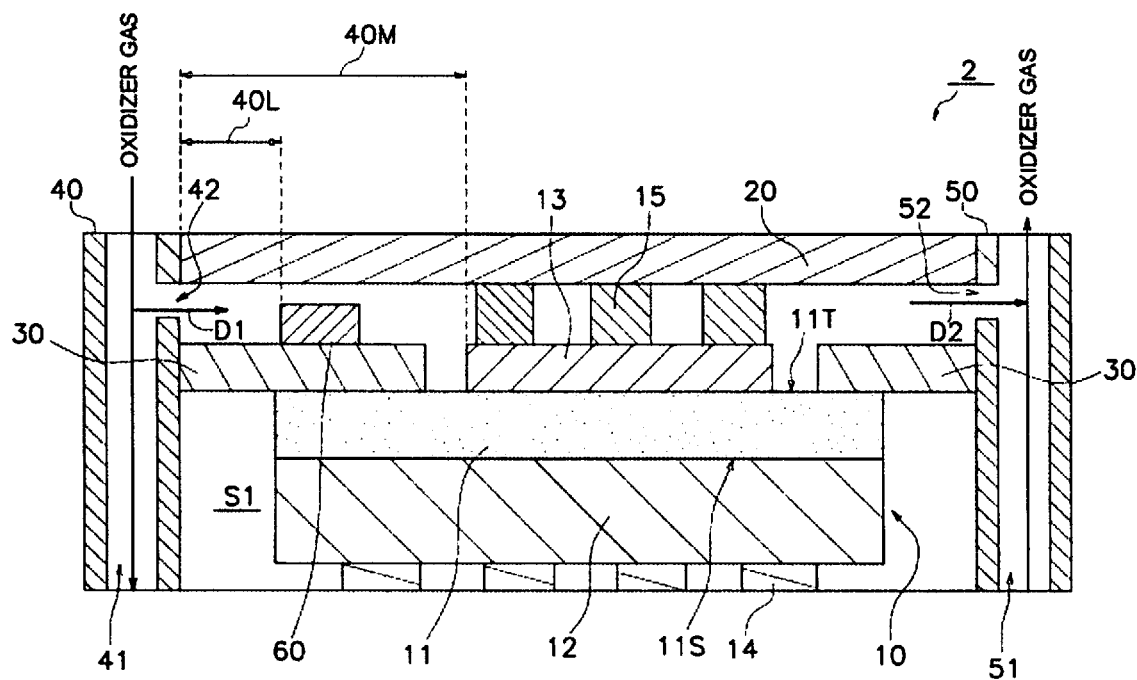
FIG. 2 is a cross-sectional view illustrating the configuration of a fuel cell device according to a second embodiment.

A fuel cell device 2 according to a second embodiment differs from the fuel cell device 1 according to the first embodiment in that the contaminant trap portion 60 is arranged on top of the separator 30. Differences between the two fuel cell devices are described below. FIG. 2 is a cross-sectional view illustrating the configuration of the fuel cell device 2 according to the second embodiment.

The contaminant trap portion 60 is disposed on the separator 30. The contaminant trap portion 60 opposes the oxidizer gas supply port 42 in the gas supply direction D1. Therefore, the oxidizer gas that enters the oxidizer gas chamber S2 from the oxidizer gas supply port 42 can hit a side wall of the contaminant trap portion 60. As a result, contaminants can be effectively trapped (adsorbed, removed) because the oxidizer gas can easily move across the contaminant trap portion 60.

The open porosity and shape of the contaminant trap portion 60 are not particularly limited. The contaminant trap portion 60 is disposed on the side of the oxidizer gas supply port 42 of the cathode 13 in the oxidizer gas chamber S2.

At least part of the contaminant trap portion 60 is disposed 20 mm or less from the oxidizer gas supply port 42 in the gas supply direction D1 in which the oxidizer gas is supplied from the oxidizer gas supply port 42. In other words, the minimum distance 40L between the contaminant trap portion 60 and the oxidizer gas supply port 42 in the gas supply direction D1 is 20 mm or less. Therefore, contaminants can be effectively trapped because oxidizer gas at a relatively low temperature can be supplied to the contaminant trap portion 60.

The minimum distance 40L between the contaminant trap portion 60 and the oxidizer gas supply port 42 in the gas supply direction D1 is preferably two thirds or less the minimum distance 40M between the cathode 13 and the oxidizer gas supply port 42 in the gas supply direction D1, and more preferably half or less the minimum distance 40M. With this configuration, contaminants can be effectively trapped and the fuel cell 10 can be downsized.

Even in this embodiment, the contaminant trap portion 60 is separated from the cathode 13 and does not contribute to the power generation.

3. Third Embodiment

Figure 3:
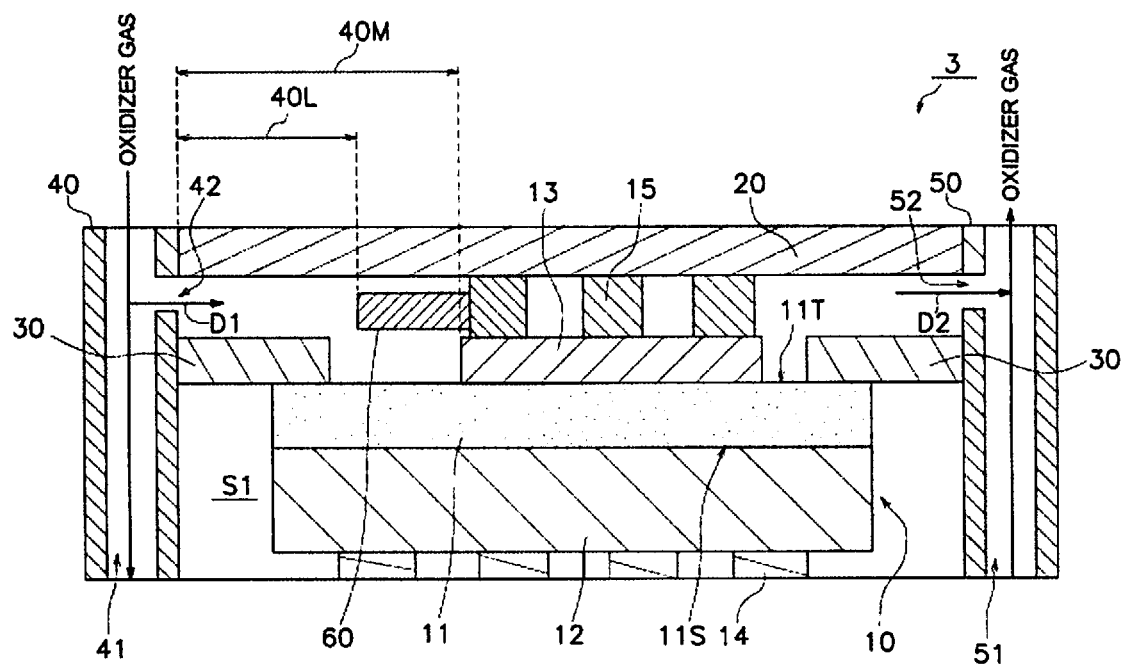
FIG. 3 is a cross-sectional view illustrating the configuration of a fuel cell device according to a third embodiment.

A fuel cell device 3 according to a third embodiment differs from the fuel cell device 1 according to the first embodiment in that the contaminant trap portion 60 is in direct contact with the cathode-side current collector 15. Differences between the two fuel cell devices are described below. FIG. 3 is a cross-sectional view illustrating the configuration of the fuel cell device 3 according to the third embodiment.

In this embodiment, the contaminant trap portion 60 is in direct contact with the cathode-side current collector 15. The contaminant trap portion 60 is electrically and mechanically connected to the cathode-side current collector 15. Therefore, in this embodiment, the contaminant trap portion 60 contributes to the power generation.

At least part of the contaminant trap portion 60 is disposed 20 mm or less from the oxidizer gas supply port 42 in the gas supply direction D1 in which the oxidizer gas is supplied from the oxidizer gas supply port 42. In other words, the minimum distance 40L between the contaminant trap portion 60 and the oxidizer gas supply port 42 is 20 mm or less. Therefore, contaminants can be effectively trapped because oxidizer gas at a relatively low temperature can be supplied to the contaminant trap portion 60.

The minimum distance 40L between the contaminant trap portion 60 and the oxidizer gas supply port 42 in the gas supply direction D1 is preferably two thirds or less the minimum distance 40M between the cathode 13 and the oxidizer gas supply port 42 in the gas supply direction D1, and more preferably half or less the minimum distance 40M. With this configuration, contaminants can be effectively trapped and the fuel cell 10 can be downsized.

In this embodiment, the contaminant trap portion 60 preferably conducts oxygen ions and electrons. Therefore, similar to the cathode 13, the contaminant trap portion 60 is in an active state and thus can more effectively trap contaminants. The contaminant trap portion 60 can be made from the material that forms the cathode 13.

Even in this embodiment, the contaminant trap portion 60 is preferably separated from the cathode 13. However, the contaminant trap portion 60 may be in direct contact with the cathode 13.

4. Fourth Embodiment

Figure 4:
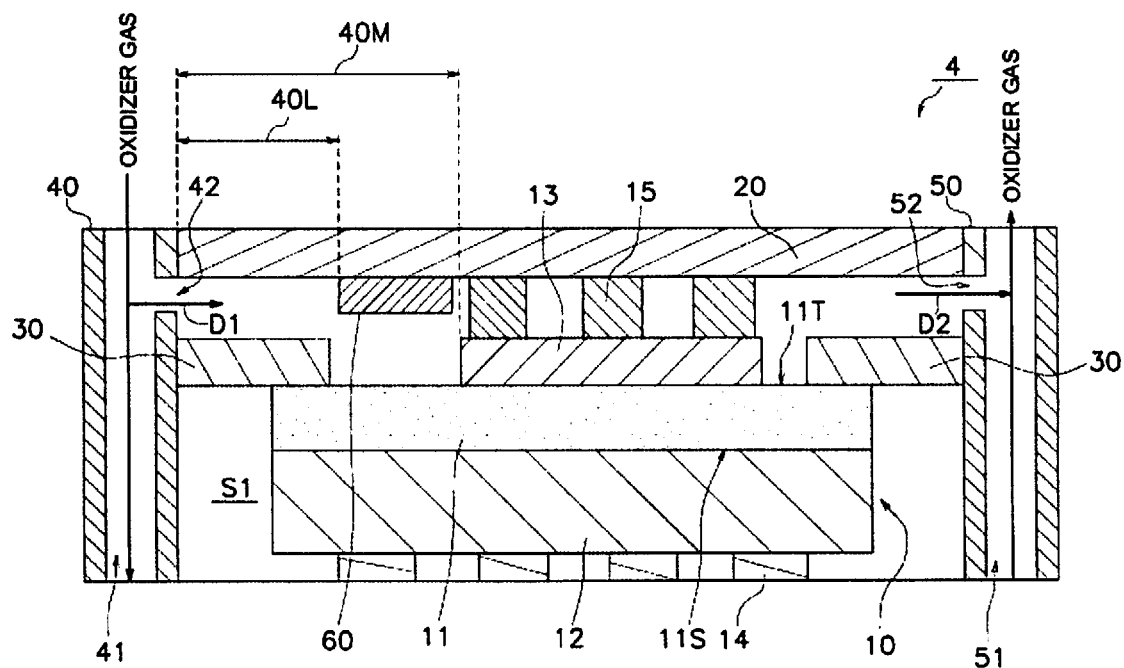
FIG. 4 is a cross-sectional view illustrating the configuration of a fuel cell device according to a fourth embodiment.

A fuel cell device 4 according to a fourth embodiment differs from the fuel cell device 1 according to the first embodiment in that the contaminant trap portion 60 is in direct contact with the interconnector 20. Differences between the two fuel cell devices are described below. FIG. 4 is a cross-sectional view illustrating the configuration of the fuel cell device 4 according to the fourth embodiment.

In this embodiment, the contaminant trap portion 60 is in direct contact with the interconnector 20. The contaminant trap portion 60 is electrically and mechanically connected to the interconnector 20. Therefore, in this embodiment, the contaminant trap portion 60 does not contribute to the power generation. In other words, the contaminant trap portion 60 does not function as a current path associated with a chemical reaction in the fuel cell 10. Therefore, the power generation performance is less likely to suffer even if the contaminant trap portion 60 has trapped contaminants.

At least part of the contaminant trap portion 60 is disposed 20 mm or less from the oxidizer gas supply port 42 in the gas supply direction D1 in which the oxidizer gas is supplied from the oxidizer gas supply port 42. In other words, the minimum distance 40L between the contaminant trap portion 60 and the oxidizer gas supply port 42 in the gas supply direction D1 is 20 mm or less. Therefore, contaminants can be effectively trapped because oxidizer gas at a relatively low temperature can be supplied to the contaminant trap portion 60.

The minimum distance 40L between the contaminant trap portion 60 and the oxidizer gas supply port 42 in the gas supply direction D1 is preferably two thirds or less the minimum distance 40M between the cathode 13 and the oxidizer gas supply port 42 in the gas supply direction D1, and more preferably half or less the minimum distance 40M. With this configuration, contaminants can be effectively trapped and the fuel cell 10 can be downsized.

Even in this embodiment, the contaminant trap portion 60 is preferably separated from the cathode 13. However, the contaminant trap portion 60 may be in direct contact with the cathode 13.

5. Fifth Embodiment

Figure 5:
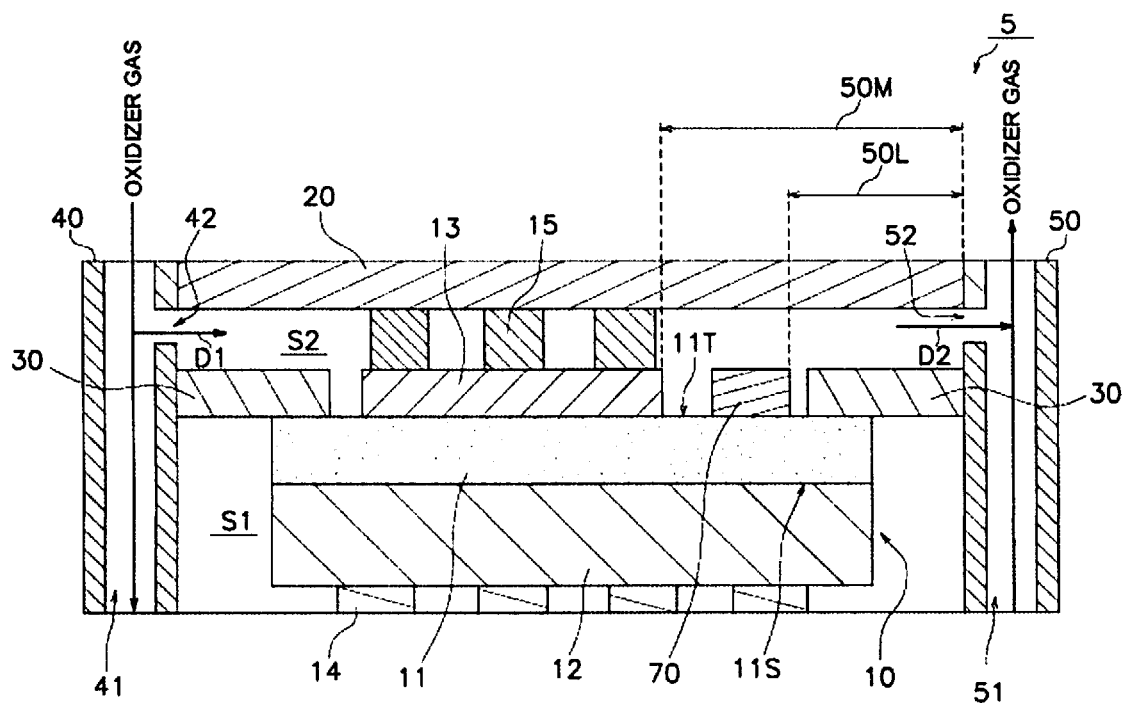
FIG. 5 is a cross-sectional view illustrating the configuration of a fuel cell device according to a fifth embodiment.

A fuel cell device 5 according to a fifth embodiment differs from the fuel cell device 1 according to the first embodiment in that a contaminant trap portion 70 is disposed on the side of the oxidizer gas discharge port 52 of the cathode 13. Differences between the two fuel cell devices are described below. FIG. 5 is a cross-sectional view illustrating the configuration of the fuel cell device 5 according to the fifth embodiment.

The contaminant trap portion 70 is an example of a "second contaminant trap portion" according to the present invention. The contaminant trap portion 70 is disposed on the second primary surface 11T of the solid electrolyte layer 11. The contaminant trap portion 70 is made from a material that can trap contaminants (at least one type of element among S, Cr, Si, B and Cl). Examples of such a material include MgO, SrO and glass, but the material is not limited thereto.

The contaminant trap portion 70 preferably contains a metal oxide. The metal oxide is preferably an oxide that contains at least one type of element selected from the group consisting of La, Sr, Sm, Gd, Pr, Nd, Co and Fe. The metal oxide is preferably a complex oxide, and more preferably the material that forms the cathode 13 (for example, a $La_{1-x}Sr_xCo_{1-y}Fe_yO_3$-type complex oxide).

The contaminant trap portion 70 preferably further contains the above-described contaminant. With this configuration, reaction activity in the contaminant trap portion 70 increases and contaminants can be effectively trapped. In order to impregnate the contaminant trap portion 70 with a contaminant, the contaminant can be doped on the metal oxide and then heat-treated (at 600° C. to 1,200° C. and from one hour to 20 hours).

Oxidizer gas can permeate the contaminant trap portion 70. The open porosity of the contaminant trap portion 70 when measured using the Archimedes' method is not particularly limited and may be between 10% and 50%. The shape of the contaminant trap portion 70 is not particularly limited. The contaminant trap portion 70 may be formed into the shape of a film, a layer, a plate, a cuboid or a sphere. Alternatively, the contaminant trap portion 70 may be divided into a plurality of components that are disposed separately.

The contaminant trap portion 70 is disposed on the side of the oxidizer gas discharge port 52 of the cathode 13 in the oxidizer gas chamber S2. In other words, the contaminant trap portion 70 is disposed in the downstream space that extends from the oxidizer gas discharge port 52 to the cathode 13 in the oxidizer gas chamber S2. The contaminant trap portion 70 is located downstream of the cathode 13 in the gas discharge direction D2.

Because of this, when a fuel cell device 101 is stopped, the contaminant trap portion 70 can trap contaminants contained in the oxidizer gas that flows back from the oxidizer gas discharge port 52 in the oxidizer gas chamber S2, which has a negative pressure due to a reduction in temperature. Therefore, any contaminants that may decrease the catalytic activity of the cathode 13 can be trapped (adsorbed, removed) from the oxidizer gas.

More specifically, at least part of the contaminant trap portion 70 is disposed 20 mm or less from the oxidizer gas discharge port 52 in the gas discharge direction D2 in which the oxidizer gas is discharged from the oxidizer gas discharge port 52. In other words, a minimum distance 50L between the contaminant trap portion 70 and the oxidizer gas discharge port 52 in the gas discharge direction D2 is 20 mm or less. Because of this, the oxidizer gas can be supplied to the contaminant trap portion 70 before the oxidizer gas that flows back in the oxidizer gas chamber S2 makes contact with the cathode 13 while the fuel cell device 101 is stopped. Therefore, the contaminant trap portion 70 can effectively trap contaminants.

The minimum distance 50L between the contaminant trap portion 70 and the oxidizer gas discharge port 52 in the gas discharge direction D2 is preferably two thirds or less a minimum distance 50M between the contaminant trap portion 70 and the cathode 13 in the gas discharge direction D2, and more preferably half or less the minimum distance 50M. With this configuration, the contaminants can be effectively trapped and the fuel cell 10 can be downsized.

In this embodiment, the contaminant trap portion 70 is separated from the cathode 13. Because of this, the contaminants that have been adsorbed by the contaminant trap portion 70 can be prevented from dispersing to the cathode 13. The contaminant trap portion 70 is also preferably separated from the cathode-side current collector 15 and the interconnector 20 in addition to the cathode 13.

In this embodiment, the contaminant trap portion 70 does not contribute to the power generation. In other words, the contaminant trap portion 70 does not function as a current path associated with a chemical reaction in the fuel cell 10. Because the contaminant trap portion 70 does not contribute to the power generation, the power generation performance is less likely to suffer even if the contaminant trap portion 70 has trapped the contaminants.

Other Embodiments

The present invention is not limited to the above-described embodiments and may be modified or altered in various ways without departing from the scope of the present invention.

In the first to fifth embodiments, the fuel cell device 1 including the fuel cell 10 is one example of an electrochemical device that includes an electrochemical cell, but the electrochemical device is not limited thereto. The electrochemical device may be an electrochemical device with an electrolyte cell that generates hydrogen and oxygen from water vapor as the electrochemical cell.

In the first to fifth embodiments, the fuel cell device 1 includes a fuel cell 10 in the shape of a flat plate, but the fuel cell 10 is not limited thereto. The contaminant trap portion 60 according to the present invention can also be applied to a fuel cell device that includes one or more fuel cells with a so-called vertical stripe shape or a horizontal stripe shape. In a fuel cell with a vertical stripe shape, an interconnector is formed on one primary surface of an electrically-conductive substrate formed with a fuel gas path, and a power generating unit (anode, solid electrolyte layer and cathode) is formed on another primary surface of the substrate. In a fuel cell with a horizontal stripe shape, a plurality of power generating units (anode, solid electrolyte layer and cathode) are formed on at least one primary surface of a non-conductive substrate formed with a fuel gas path. The plurality of power generating units are connected to each other in series. When the fuel cell device 1 includes two or more fuel cells with either a vertical stripe shape or a horizontal stripe shape, each fuel cell may be made to stand up from a fuel manifold used for supplying the fuel gas to the fuel gas path.

In the fifth embodiment, the contaminant trap portion 70 is disposed on the solid electrolyte layer 11, but the contaminant trap portion 70 is not limited to this configuration. The contaminant trap portion 70 may be disposed between the cathode 13 and the oxidizer gas discharge port 52. Therefore, as described in the second to fourth embodiments, the contaminant trap portion 70 may be disposed on the separator 30, on the cathode-side current collector 15, or on the interconnector 20. Further, the fuel cell device 5 may include the contaminant trap portion 60 (example of a "first contaminant trap portion") described in the first to fourth embodiments in addition to the contaminant trap portion 70.

Example

In this example, the effect of shortening the distance between the oxidizer gas supply port and the contaminant trap portion was investigated.

(Samples No. 1 to 16)

The fuel cell device used in Samples No. 1 to 16 is the fuel cell device 1 illustrated in FIG. 1. More specifically, the oxidizer gas supply port 42 has a height of 5 mm and a depth of 130 mm, the solid electrolyte layer 11 has a width in the gas supply direction D1 of 120 mm and a depth of 120 mm, the cathode 13 has a width of 80 mm in the gas supply direction D1 and a depth of 80 mm, and the minimum distance 40M between the cathode 13 and the oxidizer gas supply port 42 in the gas supply direction is 30 mm. In addition, the contaminant trap portion 60 has a cuboid shape with a width of 5 mm and a depth of 100 mm in the gas supply direction D1. As shown in Table 1, the minimum distance 40L between the contaminant trap portion 60 and the oxidizer gas supply port 42 in the gas supply direction D1 was changed for each sample. The contaminant trap portion 60 was made from MgO, SrO, glass or a similar material that can trap contaminants (for example, S, B or Si).

Test of Continuous Power Generation

A test of continuous power generation over 1,000 hours was performed with Samples Nos. 1 to 16 under the following conditions:

Testing temperature: 750° C.

Current density: 0.3 A/cm$^2$ (value for area of main surface of cathode 13 on which cathode-side current collector 15 is disposed)

Air was supplied to cathode (oxygen gas usage rate 40%)

Hydrogen gas was supplied to anode (fuel gas usage rate 80% or less)

The voltage at the time of the rated current load was measured for Samples No. 1 to 10 to measure the rate of change of voltage (rate of reduction of voltage) after continuous power generation for 1,000 hours at the initial voltage. The results of this measurement are shown in Table 1. In Table 1, samples that had a rate of change of voltage of less than 0.50% are evaluated with an "O" and samples that had a rate of change of voltage of 0.50% or higher are evaluated with a "X".

TABLE 1

| Sample No. | 40 L [mm] | Rate of Change of Voltage [%] | Evaluation result |
|---|---|---|---|
| 1 | 10 | 0.06 | o |
| 2 | 11 | 0.1 | o |
| 3 | 12 | 0.08 | o |
| 4 | 13 | 0.1 | o |
| 5 | 14 | 0.06 | o |
| 6 | 15 | 0.09 | o |
| 7 | 16 | 0.33 | o |
| 8 | 17 | 0.42 | o |
| 9 | 18 | 0.25 | o |
| 10 | 19 | 0.48 | o |
| 11 | 20 | 0.21 | o |
| 12 | 21 | 0.97 | x |
| 13 | 22 | 0.84 | x |
| 14 | 23 | 0.75 | x |
| 15 | 24 | 0.81 | x |
| 16 | 25 | 0.69 | x |

As shown in Table 1, with Samples No. 1 to 11 in which the minimum distance 40L between the contaminant trap portion 60 and the oxidizer gas supply port 42 in the gas supply direction D1 was changed to 20 mm or less, the rate of change of voltage could be suppressed further than with Samples No. 12 to 16 in which the minimum distance 40L was 21 mm or more. These results could be obtained because molecular motion in the contaminant trap portion 60 could be made slower by supplying the contaminant trap portion 60 with an oxidizer gas at a relatively low temperature.

As shown in Table 1, with Samples No. 1 to 6 in which the minimum distance 40L between the contaminant trap portion 60 and the oxidizer gas supply port 42 was half or less the minimum distance 40M between the cathode 13 and the oxidizer gas supply port 42, the rate of change of voltage could be suppressed further than with Samples No. 7 to 11.

The invention claimed is:

1. An electrochemical device comprising:
    an electrochemical cell including an anode, a cathode, and a solid electrolyte layer disposed between the anode and the cathode;
    an oxidizer gas supply portion having an oxidizer gas supply port for supplying oxidizer gas to the cathode; and
    a first contaminant trap portion disposed between the cathode and the oxidizer gas supply port and configured to adsorb contaminants contained in the oxidizer gas, wherein
    at least part of the first contaminant trap portion is disposed 20 mm or less from the oxidizer gas supply port in a gas supply direction in which the oxidizer gas is supplied from the oxidizer gas supply port.

2. The electrochemical device according to claim 1, wherein
    the first contaminant trap portion is in contact with the solid electrolyte layer.

3. The electrochemical device according to claim 1, further comprising:
    a separator connected to the solid electrolyte layer, wherein
    the first contaminant trap portion is in contact with the separator.

4. The electrochemical device according to claim 1, further comprising:
    an interconnector electrically connected to the cathode, wherein
    the first contaminant trap portion is in contact with the interconnector.

5. The electrochemical device according to claim 2, wherein
    the first contaminant trap portion is separated from the cathode.

6. The electrochemical device according to claim 1, further comprising:
    a cathode-side current collector connected to the cathode, wherein
    the first contaminant trap portion is in contact with the cathode-side current collector.

7. The electrochemical device according to claim 6, wherein
    the first contaminant trap portion conducts oxygen ions and electrons.

8. The electrochemical device according to claim 1, wherein
    a minimum distance between the oxidizer gas supply port and the first contaminant trap portion in the gas supply direction is half or less a minimum distance between the oxidizer gas supply port and the cathode in the gas supply direction.

9. The electrochemical device according to claim 1, wherein the first contaminant trap portion is made of a metal oxide.

10. The electrochemical device according to claim 1, further comprising:

an oxidizer gas discharge portion having an oxidizer gas discharge port for discharging the oxidizer gas supplied to the cathode; and a second contaminant trap portion disposed between the cathode and the oxidizer gas discharge port and configured to adsorb contaminants contained in the oxidizer gas, wherein at least part of the second contaminant trap portion is disposed 20 mm or less from the oxidizer gas discharge port in a gas discharge direction in which the oxidizer gas is discharged from the oxidizer gas discharge port.

11. An electrochemical device comprising:

an electrochemical cell including an anode, a cathode, and a solid electrolyte layer disposed between the anode and the cathode;

an oxidizer gas discharge portion having an oxidizer gas discharge port for discharging oxidizer gas supplied to the cathode; and a contaminant trap portion disposed between the cathode and the oxidizer gas discharge port and configured to adsorb contaminants contained in the oxidizer gas, wherein at least part of the contaminant trap portion is disposed 20 mm or less from the oxidizer gas discharge port in a gas discharge direction in which the oxidizer gas is discharged from the oxidizer gas discharge port.

* * * * *